Figure 1:
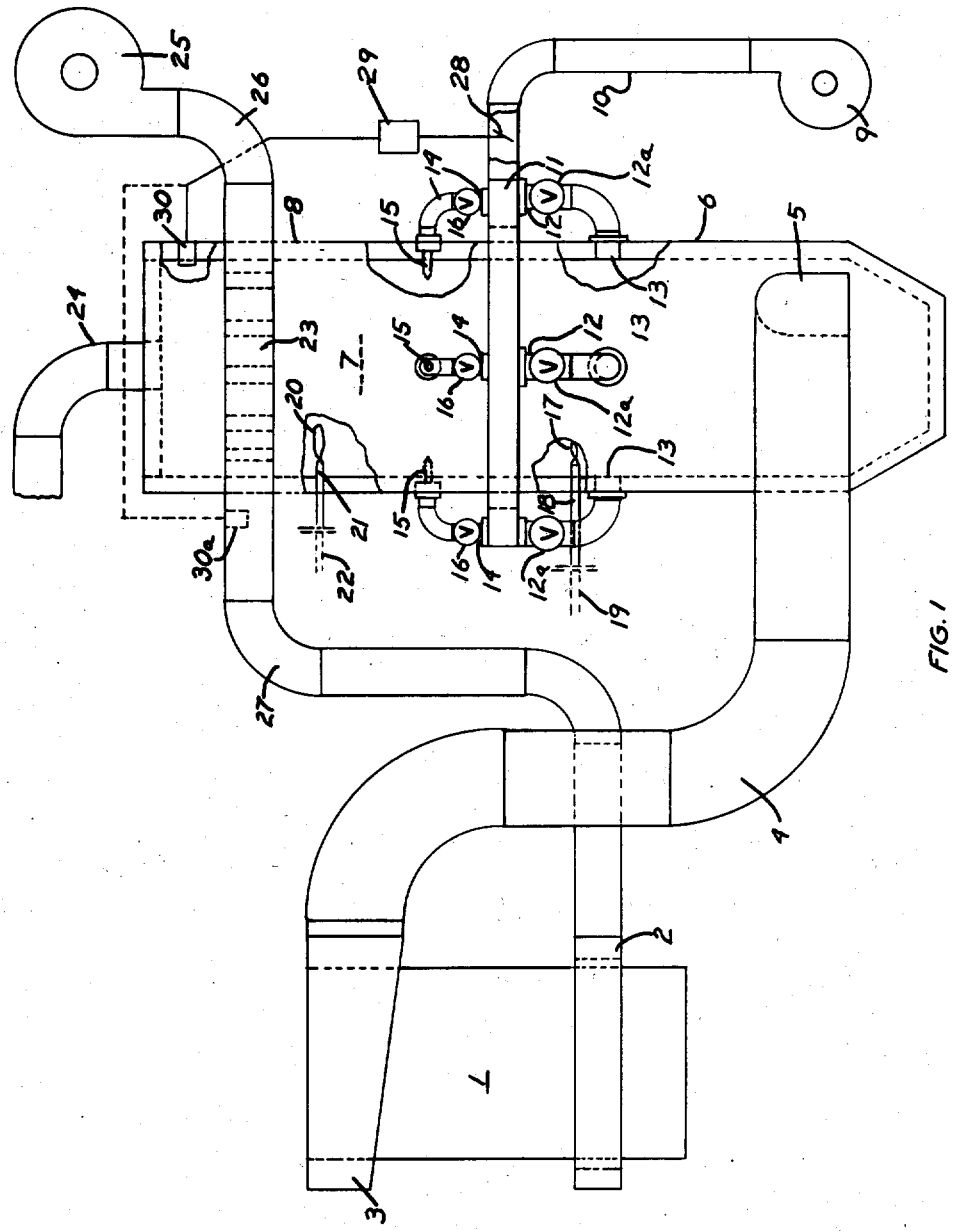

United States Patent Office
2,920,689
Patented Jan. 12, 1960

2,920,689

METHOD OF COMBUSTION FOR LOW-GRADE FUEL AND APPARATUS THEREFOR

Townsend Tinker, Orchard Park, N.Y., assignor, by mesne assignments, to American Radiator & Standard Sanitary Corporation, New York, N.Y., a corporation of Delaware Application May 15, 1952, Serial No. 287,889

4 Claims. (Cl. 158—7)

This invention relates to new and useful improvements in methods of combustion for very low-grade fuels and combustion apparatus therefor and more particularly to a method of combustion and apparatus for the burning of a very lean mixture of CO and other inert gases such as $N_2$ and $CO_2$.

The general object of this invention is to provide a novel method of combustion and apparatus therefor for burning and reclaiming waste heat from the exhaust gases from an iron melting cupola. The reclaimed waste heat from cupola exhaust gases may be used to heat the incoming blast air for the cupola or for any other suitable heating purposes.

The conditions required to burn satisfactorily cupola exhaust gases are quite different from those required for the combustion of richer fuel gases. The exhaust gases from an iron melting cupola consist of a mixture of inert gases such as $N_2$ and $CO_2$ and a small percentage of combustible CO. The $N_2$ present in these exhaust gases originates with the combustion air in the cupola while the $CO_2$ is produced from complete combustion of the coke in the cupola and the CO is produced by incomplete combustion of a part of the coke. The CO is the only burnable ingredient in the cupola exhaust gases and is normally present only to an extent of about 12 to 18%. The combustible heat content per cubic foot of cupola gas amounts to only about 50 B.t.u. as compared with 1000 B.t.u. for natural gas and 500 B.t.u. for manufactured gas. As a result of the very small quantity of combustible CO in the cupola gases, the combustion of the CO in the presence of air or $O_2$ takes place with a very lazy flame which propagates very slowly through the mixture. In spite of the very low heating value of these gases, there is such a quantity of gas produced in cupola operation that if it were all completely burned, the heat quantity would be more than enough required to furnish heat for the cupola blast air and could provide heat for other purposes.

It, therefore, becomes necessary at times to burn only a relatively small portion of the very lean cupola gases which introduces problems in the burning process. For example, if enough air is brought into the cupola gases to burn one-third of the CO present, and if this air quantity were thoroughly mixed with the entire exhaust gas stream, the resultant diluted gas stream would have such a small percentage of $O_2$ present that it would be non-inflammable and could not be made to burn satisfactorily. On the other hand, if the air is introduced in a large low velocity stream so as to remain as an air stream traveling along with the cupola exhaust gas stream and not be instantaneously mixed or completely diluted into the gas stream, then there is a slow mixing process or diffusion of air into the gas and of gas into the air. This diffusion of air and gas establishes a boundary layer around the air stream wherein there is a sufficiently rich mixture of CO and $O_2$ to support combustion. It is, therefore, possible to establish burning conditions on the boundary layers of the large low velocity air streams.

The initial combustion which takes place along the air-gas boundary layer releases heat which raises the temperature of the air and cupola exhaust gases traveling through the combustion chamber. As the combustion temperature increases, the burning process can be carried on with lower $O_2$ concentrations than could be ignited in the lower temperature regions before the additional heat of combustion had been released.

If nothing further were done than to introduce large streams of air, the boundary layer mixing and burning process would take place relatively slowly and the flames would continue for a very long distance requiring an extremely long combustion chamber to obtain a complete combustion with all of the air introduced. The reason for this very slow rate of combustion seems to be a result of the very slow rate at which the air diffuses into the cupola exhaust gas stream. The present apparatus and method of combustion provide for a more complete and more rapid combustion in a smaller combustion chamber than has been previously possible when burning such lean gases as are generated by an iron melting cupola.

This invention comprises a new and improved method of combustion and a new and improved apparatus for effecting said method of combustion which will be described more fully hereinafter and the novelty of which will be particularly pointed out and distinctly claimed.

Figure 2:
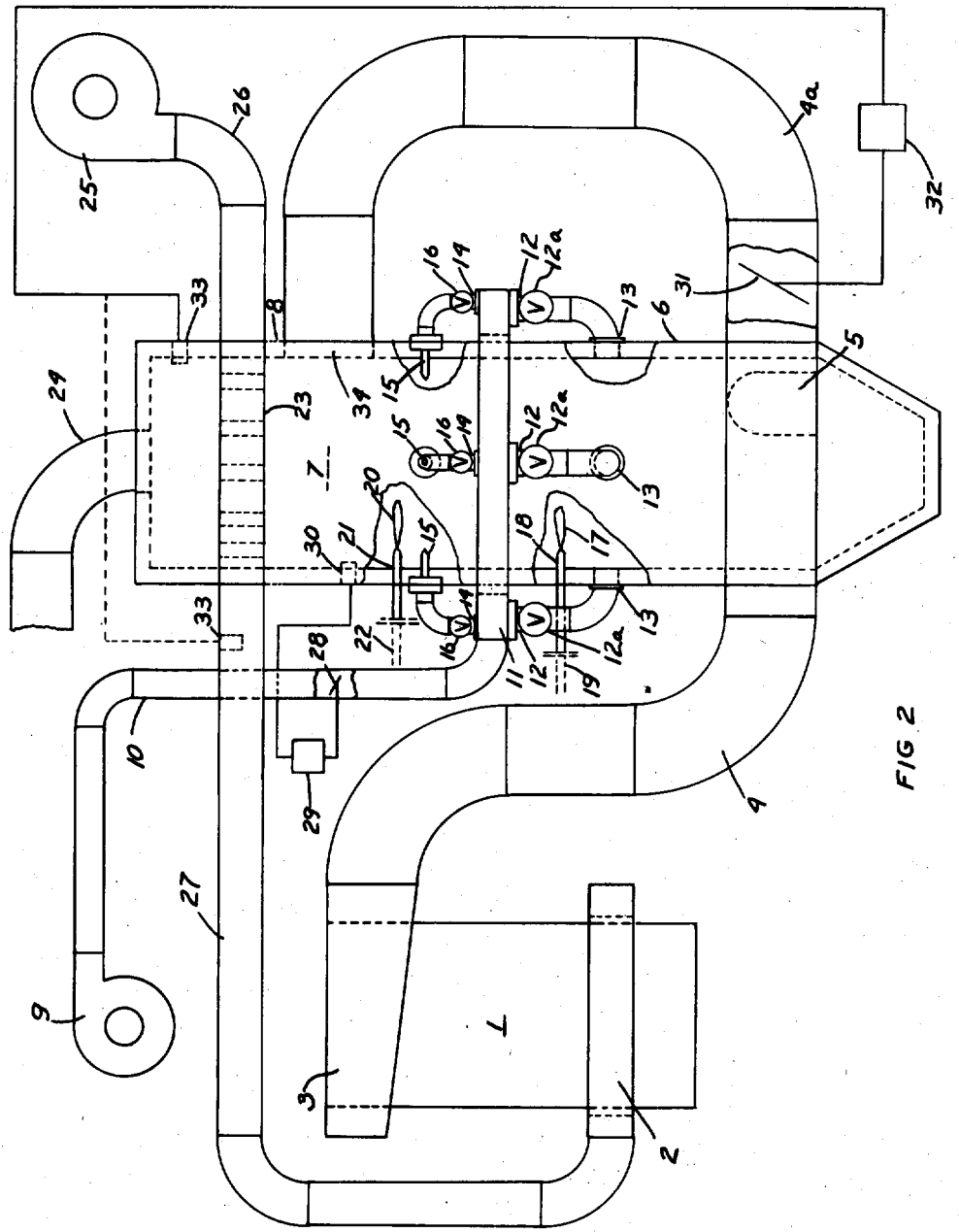

In the accompanying drawings to be taken as a part of this specification, there are clearly and fully illustrated two preferred embodiments of this invention, in which drawings:

Figure 1 discloses in more or less diagrammatic form a cupola connected to a combustion apparatus which is operable to burn cupola exhaust gases in accordance with the improved method of combustion and which is arranged to supply heat to the incoming blast air for the cupola, and Fig. 2 discloses an apparatus similar in construction to Fig. 1 wherein there is provided a controlled by-pass around the combustion chamber.

Referring to the drawings by characters of reference and more particularly to Fig. 1, there is shown in more or less diagrammatic form an iron melting cupola 1 having an air inlet bustle 2 and a gas off-take bustle 3. The gas off-take bustle 3 is connected by a gas transfer duct 4 to the inlet 5 of a vertical cylindrical combustion apparatus 6. The combustion apparatus 6 has a hollow cylindrical interior which extends vertically therethrough and which provides a combustion chamber 7. The combustion apparatus 6 is illustrated as being considerably shorter than its actual construction as indicated by the dotted lines 8. The combustion air for burning the cupola exhaust gases in the combustion chamber 7 is supplied by a fan or blower 9 which is connected by a duct 10 to an annular air inlet bustle 11. The air inlet bustle 11 is connected by a plurality of conduits 12 to a plurality of inlet connectors 13, respectively, and having valves 12ᵃ controlling flow therethrough. The air inlet bustle 11 is also connected by a plurality of conduits 14 to a plurality of air inlet jets 15. The conduits 14 each have a control valve 16 therein which may be adjusted to determine the volume of air flow therethrough and the velocity of the air issuing from the jets 15. The combustion chamber 7 is provided with an ignition means such as a gas pilot flame 17 issuing from a pilot burner nozzle 18 at a point between the large air inlet connections 13 and the air jet inlets 15. The pilot burner nozzle 18 is supplied with gas through a supply conduit indicated by the dotted lines 19. At a point beyond the air inlet jets 15 there may be provided a second pilot flame 20 issuing from a burner nozzle 21 and supplied with gas through a supply pipe indicated diagrammatically as 22. The pilot flame 20 assists in igniting the combustible mixture of gas and air after it has passed the high velocity air jets 15. At the upper end of the combustion chamber the combustion products pass through a heat exchanger 23 and are discharged to atmosphere through a stack or flue 24. The cupola 1 which provides the exhaust gases which are burned in the combustion chamber 7 is supplied with air by a high pressure fan 25 which is preferably operable to supply air under a sufficient pressure to cause the same to move through the cupola for combustion therein and through the combustion apparatus 6 and out the flue 24. The fan 25 is connected by a conduit 26 to one side of the heat exchanger 23. The blast air for the cupola is heated to a desired temperature in the heat exchanger 23 and is discharged into the intake bustle 2 of the cupola 1 through a conduit 27. The air supplied to the combustion apparatus 6 is controlled by a valve or damper 28 in the supply duct 10 which is controlled by a control device 29 which is shown diagrammatically and which is controlled by a suitable thermostatic element 30. The element 30 is responsive to the temperature of combustion products at the outlet end of the combustion apparatus 6 after said products have passed through the heat exchanger 23, or may be positioned at 30ª for response to air temperature at the outlet from the heat exchanger 23.

Operation

In operation, this apparatus and combustion method function generally as follows. When the hot blast air is supplied through conduit 27 and intake bustle 2 to the cupola 1 and the charge therein is ignited, the combustion products which are discharged from the cupola comprise about 12 to 18% CO and 82 to 88% $CO_2$ and $N_2$. The cupola exhaust gases are removed through the off-take bustle 3 and discharged through the supply duct 4 to the inlet 5 of the combustion apparatus 6. As the exhaust gases move upward within the combustion chamber 7, they first pass the main air inlet 13. At this point a relatively large quantity of air is introduced into the exhaust gases which forms separate thick air streams therein which diffuse very slowly into the cupola exhaust gases. The separate exhaust gas and air streams pass upward and the peripheral boundary layer is ignited by the pilot flame 17. As was previously pointed out, the combustion of this very lean mixture of CO and inert gases will take place very slowly under ordinary conditions. However, as this mixture of gases is heated by a continued combustion of the CO therein, the rate of diffusion of gas into air and air into gas is increased so that the rate of combustion will begin to increase slightly. When the combustion temperature has reached a point that the flame is well established; i.e., where the rate of diffusion of gas and air and the rate of combustion have become fairly rapid, the gases will have reached the position of the supplemental air inlets or high velocity jets 15. At this point, an additional amount of air required to complete the combustion of the desired amount of CO in the exhaust gases is introduced in a plurality of high velocity air jets intersecting the gas and air streams which causes a very high turbulence in the gas and air stream and a rapid diffusion of the gas into the air stream and air into the gas stream to increase very rapidly the rate of combustion. By the use of these supplemental high velocity air jets, it is possible to obtain substantially complete combustion of the cupola exhaust gases in a relatively small combustion chamber. The supplemental pilot flame 20 may be provided to assist in the spread of combustion through the mixture after it has passed the air jets 15 to insure that no burnable mixture passes that point in the combustion chamber. The combustion products pass through the heat exchanger 23 and give up a large portion of their heat to the blast air which is supplied by the fan 25 and are then discharged through the outlet flue or stack 24. Since in an apparatus of this type only a portion of the CO is burned at any particular time, the temperature of the combustion products can be controlled by controlling the total amount of combustion which takes place which is accomplished by varying the quantity of air supplied through the main air inlets 13 and the air jets 15. This temperature control is effected by a thermostatic control mechanism comprising a controller 29 and thermostatic element 30 which is positioned for response to outlet temperature from the combustion chamber 7 or outlet temperature from the heat exchanger 23. This thermostatic control is effective to vary the extent of opening of a damper 28 to determine the quantity of air supplied to the combustion chamber 7. It should also be noted that the control which is effective through movement of the damper 28 could also be effected by varying the speed of the fan 9. When only a part of the cupola gases is being burned, the air which is mixed therewith will cause a complete combustion of only that part. The resulting combustion products will thereupon be thoroughly mixed with the unburned gas portion to produce the controlled outlet temperature for heating the heat exchanger and the air passing therethrough to its desired value.

In the apparatus which is shown in Fig. 2, every element of construction is the same as in Fig. 1, and is given the same reference numeral as in Fig. 1, except for the addition of a by-pass around the combustion chamber and a damper control mechanism therefor. In this construction there is provided a by-pass conduit 4ª from the inlet 5 of the combustion apparatus 6 to the outlet end portion of said apparatus. The by-pass conduit 4ª is provided with a valve or damper 31 which is controlled by a control mechanism 32 operated in response to a thermostatic controller 33 which may respond to combustion outlet temperature or heat exchanger outlet temperature. The by-pass conduit 4ª is connected to the outlet end of combustion chamber 7 and discharges thereinto at a point 34 just below the heat exchanger 23. In this arrangement, the air controller 29 is preferably a combustion responsive controller having its element 30 responsive to the state of combustion just ahead of the by-pass inlet 34.

In this form of apparatus and method of combustion, the portion of cupola exhaust gas which passes through the combustion chamber 7 is burned in the same manner as indicated in Fig. 1. However, in this arrangement, all of the gas which passes through the combustion chamber 7 is completely burned and so much of the gas as is not required to be burned is by-passed through the by-pass conduit 4ª and mixed with the combustion products just prior to entering the heat exchanger 23 to obtain the desired temperature. The relative amount of cupola exhaust gases which pass through the combustion chamber 7 and through the by-pass conduit 4ª are controlled by a valve or damper 31 which is operated by a controller 32 having a thermostatic element 33 positioned for response to temperature on the outlet side of the heat exchanger 23. The air supply damper 28 is automatically controlled for complete combustion of the gases flowing through the combustion chamber 7.

Although in this specification there have been described only two embodiments of the method of combustion which embodies this invention and the apparatus for accomplishing that method, it will be obvious to those skilled in the art that other modifications of this method and other apparatus for accomplishing this method might be constructed without departing from the scope and intent of this invention which should be limited only by the appended claims.

Having thus described the invention, what is claimed and desired to be secured by Letters Patent of the United States is:

1. The process of burning a moving gas stream comprising a very lean mixture of CO and inert gases such as $N_2$ and $CO_2$ which comprises the steps of dividing the stream into separate parts, introducing a quantity of air sufficient for complete combustion of one gas stream part, igniting the gas-air mixture, and mixing the combustion products of said one gas stream part with the other gas stream part subsequent to said combustion to obtain a predetermined temperature.

2. The process of burning a moving gas stream comprising a very lean mixture of CO and inert gases such as $N_2$ and $CO_2$ which comprises the steps of dividing the stream into separate parts, introducing a part of the air required for complete combustion of one gas stream part, igniting the gas-air mixture, introducing the balance of the required combustion air in a plurality of high velocity jets at a point in the gas stream at which combustion temperature has reached a value sufficient to effect a rapid diffusion of air into the combustible mixture, and mixing the combustion products of said one gas stream part with the other gas stream part subsequent to said combustion to obtain a predetermined temperature.

3. A combustion apparatus for burning a very lean mixture of CO and inert gases such as $N_2$ and $CO_2$ comprising means forming a hollow combustion chamber having an inlet and an outlet for said gas mixture, means including a plurality of large air supply conduits for supplying a quantity of combustion air at low velocity to the inlet end of said combustion chamber, means including a plurality of high velocity air inlet jets opening into said combustion chamber and spaced from said air supply conduits in the direction of the outlet end of said combustion chamber, ignition means in said combustion chamber at a point between said air supply conduits and said air inlet jets, a by-pass conduit from the inlet to the outlet end of the combustion chamber, valve means controlling the relative flow of gas through said combustion chamber and said by-pass conduit, and thermostatic means controlling said valve means in response to the heat output of combustion products at the outlet end of said combustion chamber.

4. A combustion apparatus for burning a very lean mixture of CO and inert gases such as $N_2$ and $CO_2$ comprising means forming a hollow combustion chamber having an inlet and an outlet for said gas mixture, means including a plurality of large air supply conduits for supplying a quantity of combustion air at low velocity to the inlet end of said combustion chamber, means including a plurality of high velocity air inlet jets opening into said combustion chamber and spaced from said air supply conduits in the direction of the outlet end of said combustion chamber, ignition means in said combustion chamber at a point between said air supply conduits and said air inlet jets, a by-pass conduit from the inlet to the outlet end of the combustion chamber, valve means controlling the relative flow of gas through said combustion chamber and said by-pass conduit, thermostatic means controlling said valve means in response to the heat output of combustion products at the outlet end of said combustion chamber, and an automatically controlled air supply valve operated by a control device responsive to the state of oxidation of combustion products and operable to vary the air supply to insure complete combustion of the gas stream portion flowing through the combustion chamber.

References Cited in the file of this patent

UNITED STATES PATENTS

| | | |
|---|---|---|
| 1,262,841 | Randolph | Apr. 16, 1918 |
| 1,627,536 | Vial et al. | May 3, 1927 |
| 1,659,869 | Gow | Feb. 21, 1928 |
| 1,950,787 | Ellingham | Mar. 13, 1934 |
| 2,110,209 | Engels | Mar. 8, 1938 |
| 2,203,554 | Uhri et al. | June 4, 1940 |
| 2,253,920 | Vaughan | Aug. 26, 1941 |
| 2,282,551 | Yates | May 12, 1942 |
| 2,368,827 | Hanson et al. | Feb. 6, 1945 |